United States Patent
Mantkowski et al.

(10) Patent No.: US 7,533,487 B1
(45) Date of Patent: May 19, 2009

(54) PORTABLE HEATING APPARATUS

(76) Inventors: Robert E. Mantkowski, 3106 E. Venice Ave., Venice, FL (US) 34292; Joseph R. Mantkowski, 3106 E. Venice Ave., Venice, FL (US) 34292

( * ) Notice: Subject to any disclaimer, the term of this patent is extended or adjusted under 35 U.S.C. 154(b) by 418 days.

(21) Appl. No.: 11/410,236

(22) Filed: Apr. 24, 2006

(51) Int. Cl.
  *A01G 13/06* (2006.01)
(52) U.S. Cl. .............................. 47/2; 47/23.3; 126/59.5
(58) Field of Classification Search ................. 47/23.3, 47/2; 126/59.5
  See application file for complete search history.

(56) References Cited

U.S. PATENT DOCUMENTS

| | | | |
|---|---|---|---|
| 1,126,426 A | | 1/1915 | Eddy |
| 1,632,611 A | * | 6/1927 | Lloyd .......................... 239/280 |
| 1,758,941 A | * | 5/1930 | Gibson ......................... 405/37 |
| 1,991,851 A | * | 2/1935 | Hammell .................. 47/58.1 R |
| 2,006,562 A | * | 7/1935 | Scheu ............................. 47/2 |
| 2,529,339 A | | 11/1950 | Irvine et al. |
| 2,632,978 A | | 3/1953 | Fetrow |
| 2,655,764 A | * | 10/1953 | Watkins ........................... 47/2 |
| 2,846,816 A | | 8/1958 | Maloof |
| 2,953,870 A | | 9/1960 | Nelson |
| 3,003,282 A | | 10/1961 | Davies |
| 3,055,145 A | | 9/1962 | Lindsay |
| 3,205,885 A | * | 9/1965 | Baxley ....................... 126/59.5 |
| 3,292,306 A | | 12/1966 | Carlson |
| 3,296,739 A | | 1/1967 | Wiegel |
| 3,540,822 A | * | 11/1970 | Filliol et al. ................. 431/207 |
| 3,716,042 A | * | 2/1973 | Smith ........................ 126/59.5 |
| 3,744,476 A | * | 7/1973 | Georges ..................... 126/59.5 |
| 3,842,536 A | | 10/1974 | Schick |
| 4,137,041 A | * | 1/1979 | Woodroff et al. ........... 432/222 |
| 4,327,704 A | * | 5/1982 | Fredrickson ............... 126/59.5 |
| 4,642,938 A | | 2/1987 | Georges et al. |
| 5,277,877 A | * | 1/1994 | Jeffrey et al. ................. 47/66.6 |
| 5,285,769 A | * | 2/1994 | Wojcicki .................... 126/59.5 |
| 5,397,382 A | * | 3/1995 | Anderson ..................... 96/135 |
| 5,964,233 A | | 10/1999 | Clark et al. |
| 6,192,878 B1 | | 2/2001 | Waters |
| 6,638,338 B2 | * | 10/2003 | Logstrup ....................... 95/90 |
| 6,926,520 B2 | | 8/2005 | Home |

FOREIGN PATENT DOCUMENTS

FR  2665050 A1 * 1/1992

* cited by examiner

*Primary Examiner*—Son T. Nguyen
(74) *Attorney, Agent, or Firm*—Charles J. Prescott

(57) ABSTRACT

A portable apparatus for protecting a specimen tree from substantial cold weather damage. The apparatus includes a hollow housing preferably having a generally flattened configuration and being adapted in horizontal size for positioning beneath, and being substantially smaller than, a canopy perimeter width of the tree. An air movement source is mounted within, and arranged to draw air into the housing preferably through apertures in a lower panel thereof. Air discharge openings are formed around an edge perimeter of said housing for discharging air generally laterally or radially outwardly therefrom produced by the air movement source. A ground support is connectable to and for holding the housing above the ground and beneath a canopy of the tree so that discharging air protectively intermingles with, and produces airflow around the foliage of the tree. An air heat source is also provided which enhances foliage protection.

13 Claims, 5 Drawing Sheets

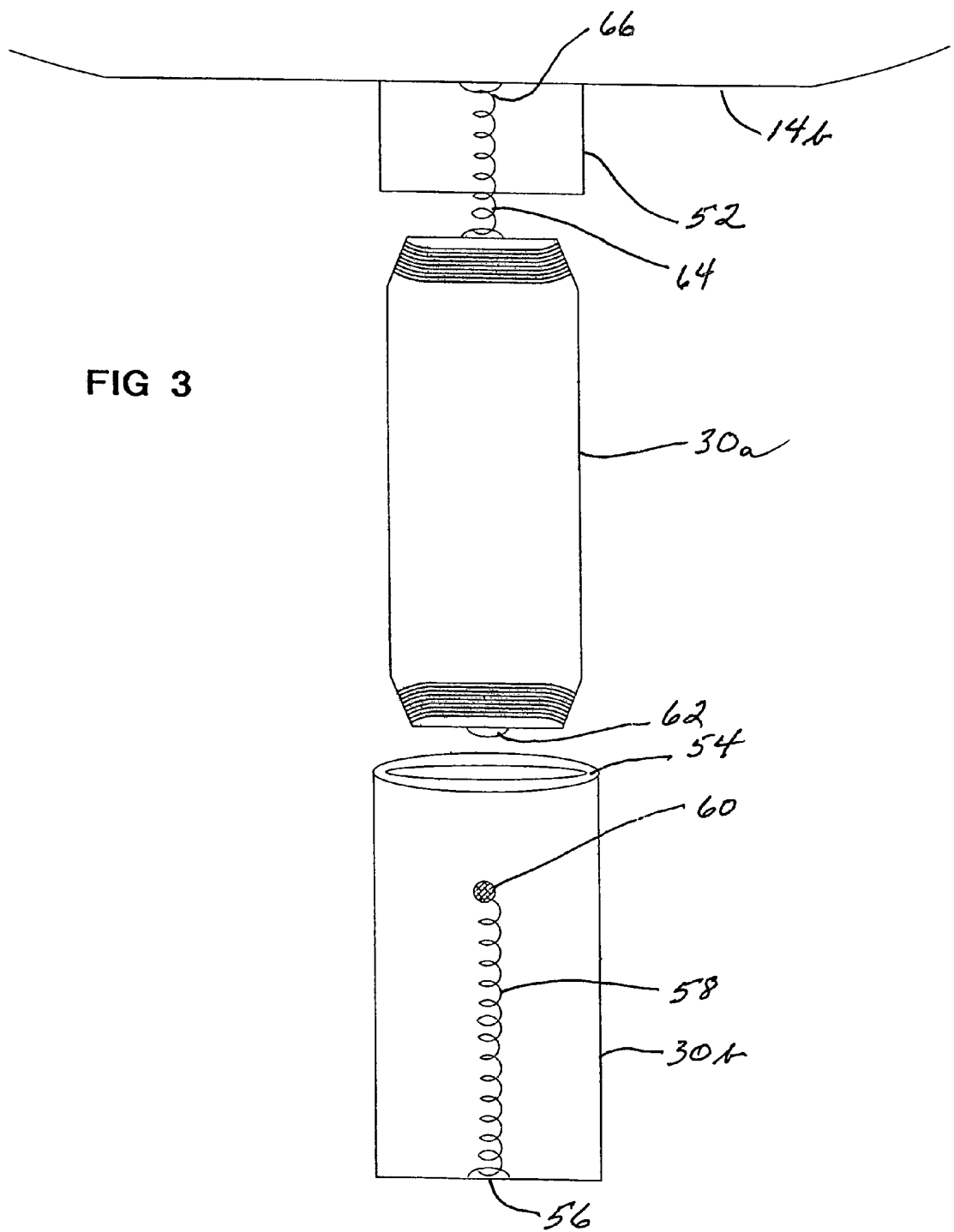

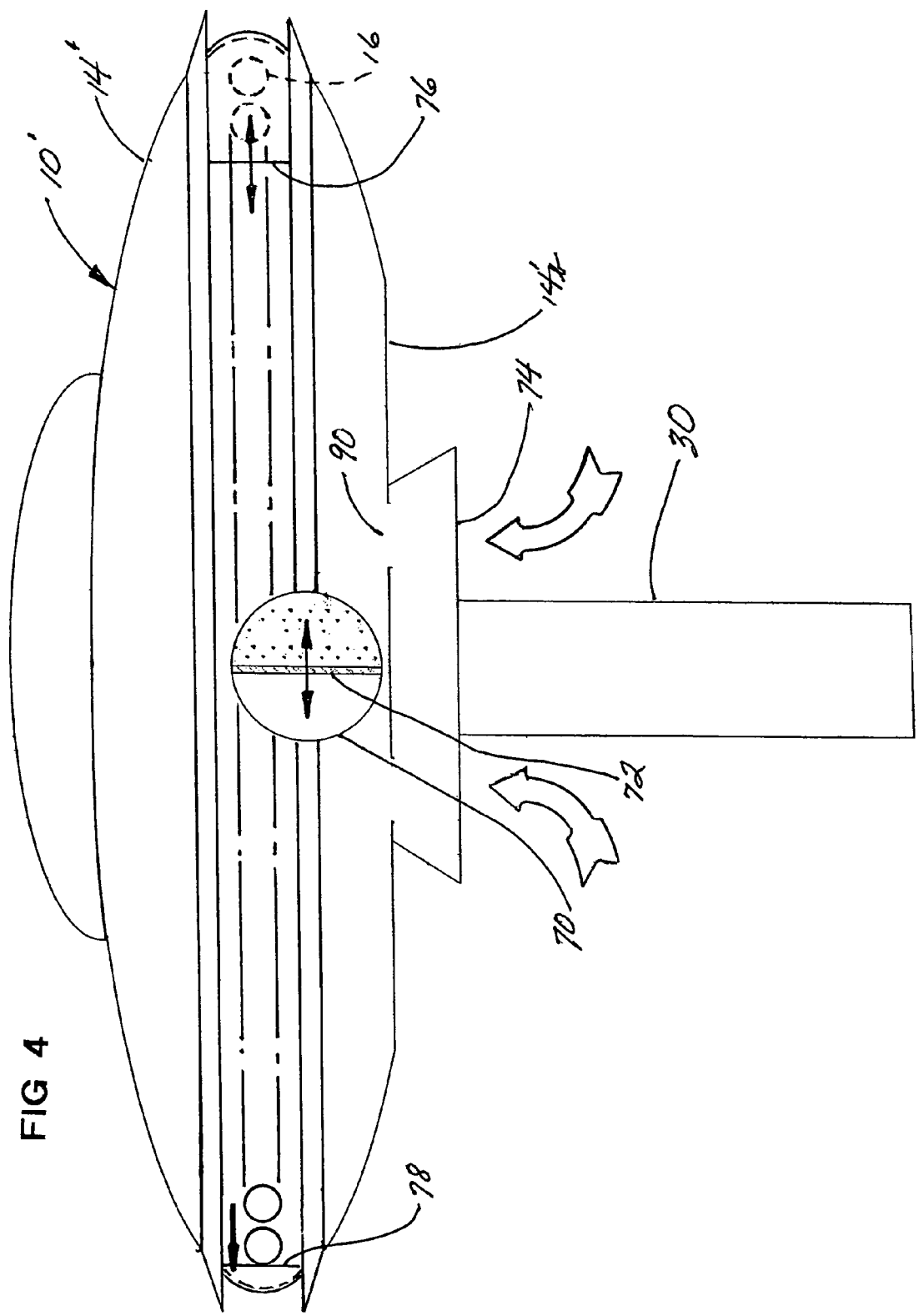

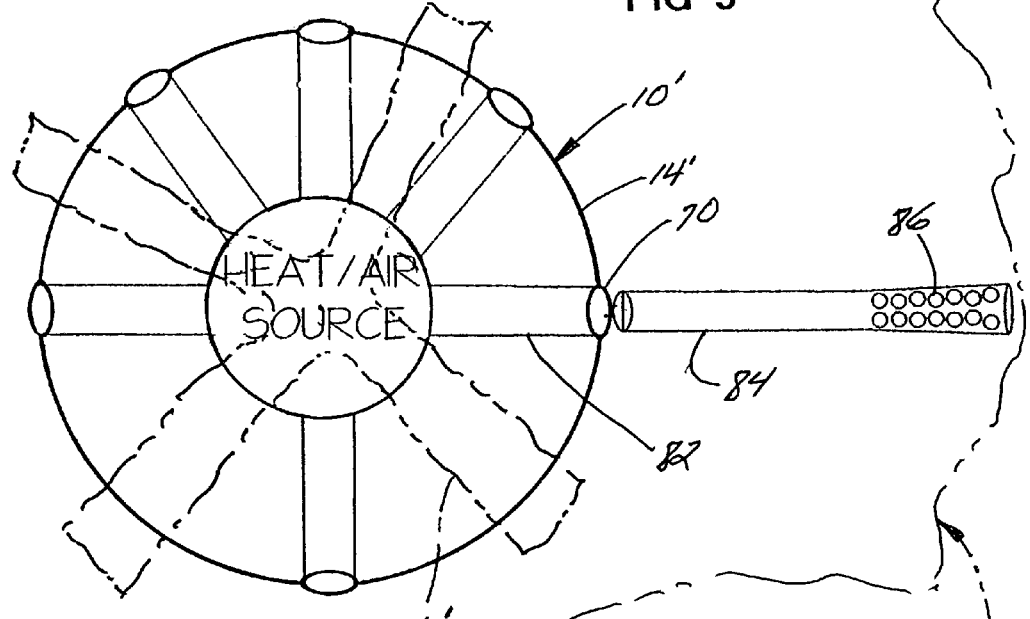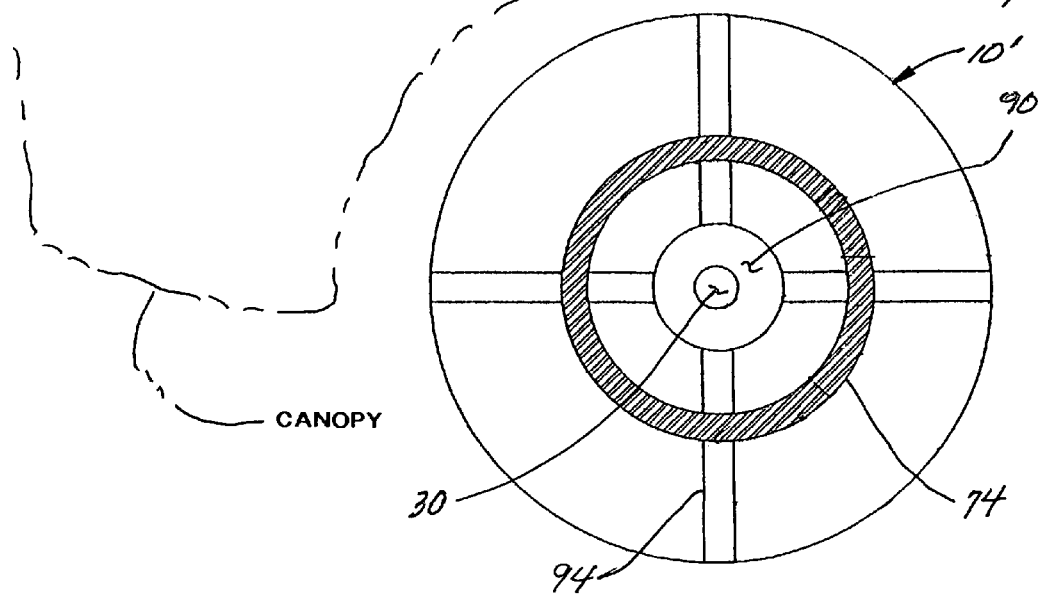

PORTABLE HEATING APPARATUS

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to systems protecting plant life and trees, and more particularly to a portable apparatus for protecting specimen trees from substantial cold weather damage.

2. Description of Related Art

Specimen trees are typically native trees of a species and size which has been established by a community, municipality or region to possess distinctive form, size or age, and to represent an outstanding specimen of such a desired species. Specimen trees therefore have enhanced value and the property owners of such trees will typically want to protect them more diligently from weather damage.

One such form of weather damage in critical southern areas of the country is unexpected severe cold weather. Severe cold weather will not only damage, but also destroy specimen trees, especially those which are typically found in southern climates. In order to protect such specimen trees and other plant life from the ravages of severe cold weather, typically only a small amount of air movement and/or heated air is needed for this purpose. Unless temperatures drop to substantially below the freezing point, only slight amounts of air movement and/or heated air will serve this protective purpose.

A number of prior art devices and apparatus somewhat fulfill the intended purpose of the present invention but all have significantly different structure and function. Those prior art apparatus and systems are described as follows.

U.S. Pat. No. 1,126,426 to Eddy discloses an apparatus for protecting trees and U.S. Pat. No. 2,529,339 to Irvine discloses a blower system for frost prevention. A method and apparatus for heating orchards is taught by Fetrow, et al. in U.S. Pat. No. 2,632,978 and a device for heating orchards is disclosed by Watkins in U.S. Pat. No. 2,655,764.

U.S. Pat. No. 2,846,816 to Maloof teaches an air handling and heating apparatus and Nelson teaches an apparatus for controlling frost damage to trees in U.S. Pat. No. 2,953,870. Davies discloses a frost-protective device for growing vegetation in U.S. Pat. No. 3,003,282 and Lindsay teaches an air-distributing machine in U.S. Pat. No. 3,055,145. A method and apparatus for large-scale climate control is disclosed in U.S. Pat. No. 3,292,306 to Carlson.

Wiegel teaches a rotating orchard heater in U.S. Pat. No. 3,296,739 and Schick discloses a method for protecting vegetation in U.S. Pat. No. 3,842,536. An orchard heater is taught by Fredrickson in U.S. Pat. No. 4,327,704 and a plant protection system is disclosed in U.S. Pat. No. 4,642,938 to Georges, et al.

A patio umbrella with a radiant heater is disclosed in U.S. Pat. No. 5,964,233 to Clark, et al. and Waters discloses a heating apparatus in U.S. Pat. No. 6,192,878. An outdoor table heater is shown in U.S. Pat. No. 6,926,520.

The present invention provides a portable apparatus which is easily deployable for short time periods, e.g. overnight, beneath the canopy of a specimen tree and which produces sufficient amounts of airflow and, preferably heated airflow, which rises around and through the branches of the canopy. This air movement, mingling with and through the limbs and branches of the specimen tree, will serve to protect the tree from significant damage at temperatures below freezing. A low voltage power source is all that is required to operate an air heater/blower within the apparatus.

BRIEF SUMMARY OF THE INVENTION

This invention is directed to a portable apparatus for protecting a specimen tree from substantial cold weather damage. The apparatus includes a hollow housing preferably having a generally flattened configuration and being adapted in horizontal size for positioning beneath, and being substantially smaller than, a canopy perimeter width of the tree. An air movement source is mounted within, and arranged to draw air into the housing preferably through apertures in a lower panel thereof. Air discharge openings are formed around an edge perimeter of said housing for discharging air generally laterally or radially outwardly therefrom produced by the air movement source. A ground support is connectable to and for holding the housing above the ground and beneath a canopy of the tree so that discharging air protectively intermingles with, and produces airflow around the foliage of the tree. An air heat source is also provided which enhances foliage protection.

It is therefore an object of this invention to provide a portable apparatus for protecting a specimen tree from substantial cold weather damage.

Still another object of this invention is to provide a portable apparatus which gently disperses a warmed airstream through the branches and canopy of a specimen tree to substantially reduce the harm imposed by severe cold weather.

Yet another object of this invention is to provide a portable apparatus for protecting a specimen tree which is powered by a safe, low voltage electrical power source.

Still another object of this invention is to provide a portable apparatus for protecting a specimen tree from substantial cold weather damage which is itself substantially resistant to, and protected from, the detrimental effects caused by a blowing rain.

In accordance with these and other objects which will become apparent hereinafter, the instant invention will now be described with reference to the accompanying drawings.

BRIEF DESCRIPTION OF THE SEVERAL VIEWS OF THE DRAWING(S)

FIG. 3 is an enlarged exploded view of the upper portion of the ground support member of FIG. 2.

FIG. 4 is a simplified schematic side elevation view of another embodiment of the invention.

FIG. 5 is a top plan fragmentary view of FIG. 4 showing an addition of tubular air flow passages and showing the limbs and partial canopy of a specimen tree in phantom.

FIG. 6 is a bottom plan view of FIG. 5.

DETAILED DESCRIPTION OF THE INVENTION

Figure 1:
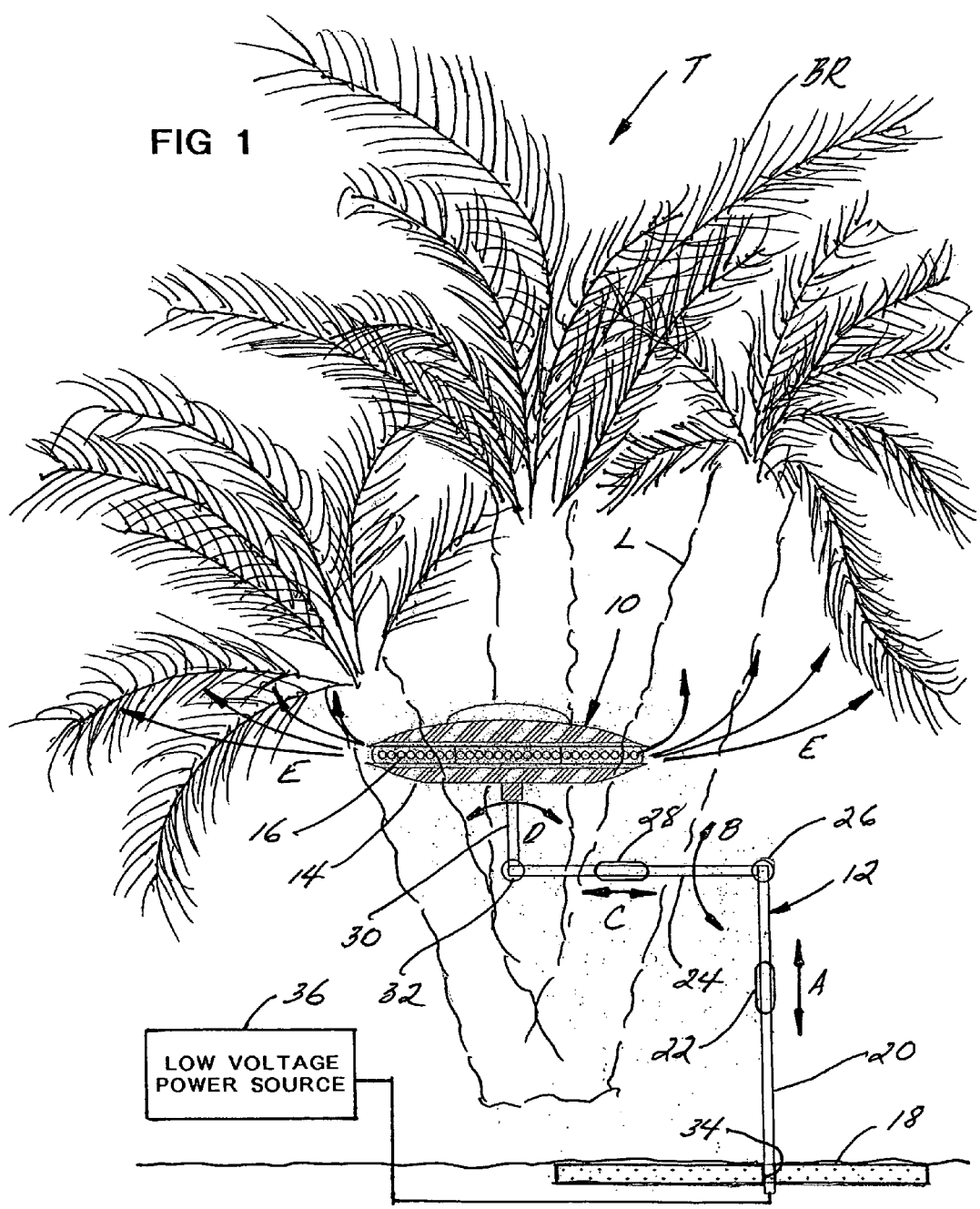
FIG. 1 is a simplified pictorial view of the invention in operative position beneath the foliage canopy of a multi-trunk palm tree.
Figure 2:
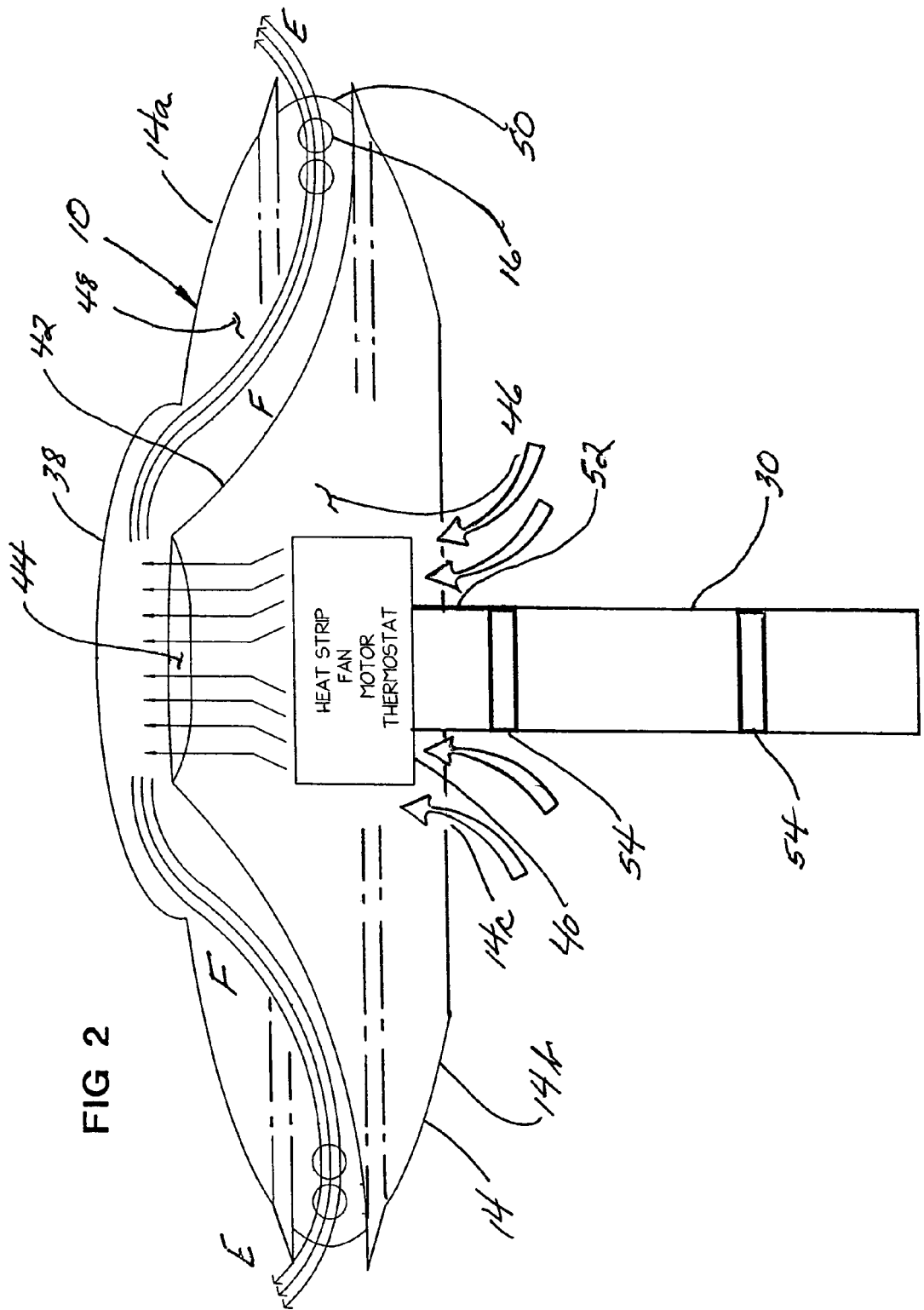
FIG. 2 is a simplified side elevation schematic view of the invention.

Referring now to the drawings, and firstly to FIGS. 1 and 2, the preferred embodiment of the invention is there shown generally at numeral 10 positioned within the limbs or trunks L of a specimen tree T which is shown, for example, as a pygmy palm tree. The tree T has branches BR which are feathery in nature and define a tree canopy as an imaginary envelope around the outer tips of the branches BR.

The apparatus 10 is supported in the selected position beneath the canopy and within the limbs L by a ground support 12 which is also portable in nature and connectable at its upper leg 30 into a mating socket 52 of the apparatus 10. The lower end of the lower leg 20 of the ground support 12 is engageable into a mating socket 34 formed into a disc-shaped base 18 of sufficient weight and imbedded into the ground as shown so as to supportively stabilize the apparatus 10 in a typical cantilevered position shown in FIG. 1.

The apparatus 10 includes a hollow housing 14 having an upper panel 14a and a lower panel 14b connected together along a mating horizontal seam and generally having the flattened or oval configuration shown in FIG. 2 in side elevation view, is preferably circular in form as shown in FIGS. 5 and 6 as described herebelow. The housing 14 is formed preferably of molded thin wall plastic material and includes an interior baffle 42 which has a somewhat volcano-like form defining a central upwardly extending opening 44 from which an airstream is discharged upwardly therethrough as shown by the arrows. This airstream is produced by an air movement source 40 more commonly preferably an air blower which is operated by low voltage for security purposes.

The blower 40 further includes a heat strip operably mounted therein so that the airstream discharging from opening 44 may also be heated for enhanced cold weather protection of the tree T.

The airstream discharging from opening 44 flows within an upper interior chamber 48 between the upper surface of the interior baffle 42 and the dome-shaped upper panel 14a. The central dome area 38 deflects the airstream in the direction of arrow F downwardly and radially outwardly for discharge through a plurality of spaced outwardly facing openings 16 in the direction of arrows E. These air discharge openings 16 are formed into a central or centroidal band 50 and are typically evenly spaced apart and extend 360° around the circular perimeter of the apparatus 10.

The airstream produced by the air blower/heater 40 is introduced into a lower interior chamber 46 of the housing 14 through apertures 14c formed into the bottom panel 14b within the lower interior chamber 46. Note that the upper interior chamber 48 defined between the upper surface of the inner baffle 42 and the upper panel 14a extends downwardly in the direction of the arrows toward the openings 16 so that wind-blown rain will not be pushed sufficiently in toward the opening 44 so as to jeopardize the air blower/heater 40 during normal operation of the apparatus 10.

Still referring to FIGS. 1 and 3, a low-voltage power source 36 is operably connected to the air blower/heater 40 within the housing 14 by conventional underground wiring extending between the power source 36 and the ground support 12, and then upwardly through the ground support 12 itself and each of its elongated leg members 30a, 30b, et al. by internal compression spring contacts wiring shown at 58 and 64 having a contact ball 60 at one end and a contact 52, 62 and 66 at another end of each of these legs 30a and 30b. The preferred voltage is in the range of 12 v.d.c.

The ground support 12 includes telescoping members 22 and 28 which allow for the extension and contraction of the length of these legs shown typically at 20 in the direction of arrows A and C. Universal connectors 26 and 32 allow for adjustable movement in the direction of arrows B and D. by this arrangement, the apparatus 10 is easily positionable both laterally and vertically into an optimal position between the limbs L of the tree T so that the airstream E discharging from the apparatus 10 through the openings 16 will protectively intermingle with the branches BR or foliage of the tree T in a protective manner during cold weather conditions such as when overnight chilled air is encountered. By maintaining the power source 36 in an operative protected position interconnected to the socket 34 of the concrete base 18, whenever the apparatus 10 is needed, the ground support 12 may be simply plugged or inserted into the cavity 34 automatically making electrical communication between the power source 36 and the air blower/heater 40 to assist in quicker deployment of the apparatus 10.

Referring now to FIGS. 4, 5 and 6, an alternate embodiment of this invention is there shown generally at numeral 10' and includes a housing 14' which is substantially similar to that previously described. However, in this embodiment 10', slidable closure panels, shown typically at 76 and 78, extend around the perimeter and are movable in the direction of the arrows so as to expose or close off selected apertures 16 as desired. To selectively enhance the direction of the airstreams and to enhance the lateral reach of those airstreams where a canopy is somewhat larger as shown in FIG. 5, a plurality of tubular-like air flow passages shown typically at 82 are connected within the housing 14' and receive and transfer airflow being produced by the air blower/heater 40 (not shown in these figures) for discharge from the distal end 70 of each of the tubular passages 82. The distal end 70 of each of these tubular passages 82 is equipped with a slidable closure 72 so that the airflow may further be selectively diverted or blocked as desired.

To accommodate the larger size of the canopy which may be protected by this apparatus 10', an extension tube 84 is operably engageable into each of the distal openings 70 and includes perforations or apertures 86 formed into the distal end of each extension tube 84. By this arrangement, the warmed airflow may easily be discharged through the apertures 86 and rise upwardly to protectively intermingle with the branches of the canopy to protectively maintain the warmth previously established within the specimen tree during the day.

As best seen in FIGS. 4 and 6, to prevent blowing rain from entering into the housing 14' through the aperture 90 in the lower panel 14b, a skirt shield 74 is provided which diagonally extends downwardly from around the inlet aperture 90. This skirt shield or weather skirt 74 thus prevents driven windblown rainwater from entering into the interior of the housing 14 and damaging the air blower/heater 40 previously described.

Note in FIG. 5 that the tubular airflow passages 82 are oriented radially so as to be positionable between the limbs L' of a specimen tree which better facilitates connection of extension tubes 84 for optimal airstream discharge into the canopy of the tree T'. Support beams 94 attached to the lower panel 14b' strengthen this entire structure.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

The invention claimed is:

1. A portable apparatus for protecting a specimen tree from substantial cold weather damage comprising:

a hollow housing having a generally flattened configuration and being adapted in horizontal size for positioning beneath, and being substantially smaller than, a canopy perimeter width of the tree;

an air movement source mounted within and operably connected to an electric power source, and arranged to draw air into said housing through a lower panel thereof;

air discharge openings formed around an edge perimeter of said housing for discharging air generally laterally outwardly therefrom, said discharging air being produced by said air movement source;

a ground support connected to and for holding said housing above the ground and beneath a canopy of the tree wherein the discharging air protectively intermingles with, and produces airflow around the foliage of the tree; said housing includes an interior baffle having a volcano-like shape with a central opening being positioned substantially above said discharge openings, and extending between said air movement source and a dome-shaped top panel of said housing to form a downwardly sweeping air flow path directing airflow to said openings and preventing wind-blown rain from entering said housing through said openings and coming in contact with said air movement source.

2. A portable apparatus for protecting a specimen tree as set forth in claim 1, further comprising:

a heat source operably connected within said housing for heating air entering into said housing wherein air discharging from said housing is warmed by said heat source and enhances foliage protection.

3. A portable apparatus for protecting a specimen tree as set forth in claim 1, wherein:

said housing has a substantially circular horizontal perimeter and a dome-shaped top panel.

4. A portable apparatus for protecting a specimen tree as set forth in claim 1, wherein:

said ground support is manually articulating for selectively positioning said housing laterally and vertically beneath the canopy.

5. A portable apparatus for protecting a specimen tree as set forth in claim 1, further comprising:

tubular-like airflow passages extending laterally within said housing between said air movement source and said openings and being for establishing radially separate discrete air flow between said air movement source and said openings.

6. A portable apparatus for protecting a specimen tree as set forth in claim 5, further comprising:

a closure for each said opening to selectively control airflow directions extending from said housing.

7. A portable apparatus for protecting a specimen tree as set forth in claim 6, further comprising:

an extension tube selectively attachable to one or more said openings for laterally increasing the width of the airflow discharges.

8. A portable apparatus for protecting a specimen tree as set forth in claim 1, further comprising:

a skirt shield connected to, and diagonally downwardly extending from, said lower panel for preventing wind-blown rain from entering into said housing through air intake apertures formed in said lower panel.

9. A portable apparatus for protecting a specimen tree from substantial cold weather damage comprising:

a hollow housing having a generally flattened somewhat oval configuration in side view and being adapted in horizontal size for positioning beneath, and being substantially smaller than, a canopy perimeter width of the tree;

an air blower mounted within and connected to a low-voltage power source and being arranged to draw air into said housing through apertures formed in a lower panel thereof and to produce an airstream;

air discharge openings formed around an edge perimeter of said housing for discharging the airstream generally laterally outwardly therefrom;

a ground support connectable at an upper end thereof to and for holding said housing above the ground and beneath a canopy of the tree, said ground support connectable at a lower end thereof to a ground anchor wherein the discharging airstream protectively intermingles with, and produces airflow around the foliage of the tree;

said ground support being manually articulating for selectively positioning said housing laterally and vertically in proximity beneath the canopy;

a heat source operably connected within said housing for heating air entering into said housing wherein the airstream is warmed by said heat source to enhance foliage protection;

said housing having a substantially circular horizontal perimeter and a dome-shaped top panel; said housing includes an interior baffle having a volcano-like shape with a central opening being positioned substantially above said discharge openings, and extending between said air blower and a dome-shaped top panel of said housing to form a downwardly sweeping air flow path directing the airstream to said openings and preventing wind-blown rain from entering said housing through said openings and coming in contact with said air blower.

10. A portable apparatus for protecting a specimen tree as set forth in claim 9, further comprising:

tubular-like airflow passages extending laterally within said housing between said air blower and said openings and being for establishing radially separate discrete air flow between said air blower and said openings.

11. A portable apparatus for protecting a specimen tree as set forth in claim 10, further comprising:

a closure for each said opening to selectively control airflow amounts and directions extending from said housing.

12. A portable apparatus for protecting a specimen tree as set forth in claim 11, further comprising:

an extension tube selectively attachable to one or more said openings for laterally increasing the width of an airflow discharge pattern.

13. A portable apparatus for protecting a specimen tree as set forth in claim 9, further comprising:

a skirt shield connected to, and diagonally downwardly extending from, said lower panel for preventing wind-blown rain from entering into said housing through air intake apertures formed in said lower panel.

* * * * *